(12) United States Patent
Vossiek et al.

(10) Patent No.: US 8,299,959 B2
(45) Date of Patent: Oct. 30, 2012

(54) APPARATUS AND IMAGING METHOD WITH SYNTHETIC APERTURE FOR DETERMINING AN INCIDENT ANGLE AND/OR A DISTANCE

(75) Inventors: Martin Vossiek, Hildesheim (DE); Stephan Max, Neubokel/Grifhorn (DE)

(73) Assignee: Symeo GmbH, Neubiberg (DE)

( * ) Notice: Subject to any disclaimer, the term of this patent is extended or adjusted under 35 U.S.C. 154(b) by 315 days.

(21) Appl. No.: 12/821,763

(22) Filed: Jun. 23, 2010

(65) Prior Publication Data

US 2010/0324864 A1 Dec. 23, 2010

(30) Foreign Application Priority Data

Jun. 23, 2009 (DE) .......................... 10 2009 030 075

(51) Int. Cl.
*G01S 13/00* (2006.01)
(52) U.S. Cl. ........ 342/157; 342/147; 342/118; 342/25 R
(58) Field of Classification Search ..................... 342/25, 342/118–158
See application file for complete search history.

(56) References Cited

U.S. PATENT DOCUMENTS

| | | | |
|---|---|---|---|
| 5,448,243 A | 9/1995 | Bethke et al. | |
| 6,690,474 B1 * | 2/2004 | Shirley | 356/603 |
| 7,940,743 B2 | 5/2011 | Seisenberger et al. | |
| 7,948,431 B2 | 5/2011 | Gulden et al. | |
| 2010/0303254 A1 * | 12/2010 | Yoshizawa et al. | 381/92 |

FOREIGN PATENT DOCUMENTS

| | | |
|---|---|---|
| DE | 19512787 A1 | 9/1996 |
| DE | 19910715 C2 | 9/2000 |
| DE | 10157931 C2 | 11/2001 |
| DE | 102005037583 A1 | 2/2007 |
| DE | 102006005281 A1 | 8/2007 |
| EP | 0550073 B1 | 8/1996 |
| WO | 2006/072471 A2 | 7/2006 |

OTHER PUBLICATIONS

Cutrona et al., "Synthetic Aperture Radar", in Radar Handbook, 2nd Edition, 1990, pp. 21.1-21.23, McGraw Hill, Boston, MA.
Mensa, "Generalized Focused Imaging", in High Resolution Radar Cross-Section Imaging, 1991, pp. 183-199, Artech House, Inc., Norwood, MA.

(Continued)

*Primary Examiner* — Timothy A Brainard
(74) *Attorney, Agent, or Firm* — Drinker Biddle & Reath LLP (57) ABSTRACT

The invention relates to an imaging method with synthetic aperture for determining an incident angle and/or a distance of a sensor from at least one object in space, wherein at each of a number of aperture points one echo profile is sensed. Advantageously, for several angles assumed as the incident angle, one phase correction value and/or one distance correction value is calculated, adapted profiles are generated based on the echo profiles by adapting the phase with the phase correction value for each assumed angle and/or by shifting the distance with the distance correction value, for the assumed angle, the adapted profiles are summed or integrated, and a probability distribution is derived, and a probability value for the incident angle and/or for the distance is determined therefrom. A determination of the incident angle is also possible independently of the distance, wherein it is possible to only consider velocities or accelerations.

16 Claims, 3 Drawing Sheets

OTHER PUBLICATIONS

Rudolf, H., et al., "A Parallelogram shaped Arm for improving Circular SARs", Geoscience and Remote Sensing Symposium 1999, IGARSS '99 Proceedings, IEEE 1999 International, 1999, 1:553-555.

Gierlich et al., "Indoor Positioning Utilizing Fractional-N PLL Synthesizer and Multi-Channel Base Stations", Proceedings of the 1st European Wireless Technology Conference, EuWiT 2008, Oct. 2008, pp. 49-52.

Klausing and Holpp, "Radar mit synthetischer Apertur", in Radar mit realer und synthetischer Apertur, Konzeption und Realiseierung, 2000, pp. 213-227, Oldenbourg Verlag (with English machine translation of the introduction).

Roehr, et al., "Precise Distance and Velocity Measurement for Real Time Locating in Multipath Environments Using a Frequency-Modulated Continuous-Wave Secondary Radar Approach", IEEE Transactions on Microwave Theory and Techniques, Oct. 2008, 56(10):2329-2339.

Stelzer, et al., "A New Technology for Precise Local Position Measurement—LPM", Microwave Symposium Digest, 2004 IEEE MTT-S International, Jun. 6-11, 2004, 2:655-658.

Vossiek, et al., "An Ultrasonic Multielement Sensor System for Position Invariant Object Identification", 1994 IEEE Ultrasonics Symposium Proceedings, Nov. 1-4, 1994, 2:1293-1297.

Vossiek, et al., "Inverse Synthetic Aperture Secondary Radar Concept for Precise Wireless Positioning", IEEE Transactions on Microwave Theory and Techniques, Nov. 2007, 55(11):2447-2453.

Younis, et al., "Digital Beamforming in SAR Systems", IEEE Transactions on Geoscience and Remote Sensing, Jul. 2003, 41(71):1735-1739.

* cited by examiner

APPARATUS AND IMAGING METHOD WITH SYNTHETIC APERTURE FOR DETERMINING AN INCIDENT ANGLE AND/OR A DISTANCE

CROSS-REFERENCE TO RELATED PATENT APPLICATION

This application claims the benefit of German Patent Application No. 10 2009 030 075.9, filed on Jun. 23, 2009, in the German Patent Office, the disclosure of which is incorporated herein in its entirety by reference.

BACKGROUND

The invention relates to an imaging method with synthetic aperture for determining an incident angle and/or a distance of a sensor from at least one object or transponder in space wherein, at a number of aperture points, one respective echo profile is sensed, or a related apparatus therefor.

So-called SA systems (SA: Synthetic Aperture) are generally known, the use of which is exhaustively explained, for example, in "H. Radar with Real and Synthetic Aperture" Clausing and W. Holpp, Oldenbourg, 2000, chapter 8, pp. 213 and the following, or in M. Younis, C. Fisher and W. Wiesbeck, "Digital beamforming in SAR systems", Geoscience and Remote Sensing, IEEE Transactions on, vol. 41, pp. 1735-1739, 2003 for a microwave range. The use of SA methods is also known, for example, from International Patent Publication No. WO 2006/072471, German Patent Document No. DE 199 10 715 C2 or European Patent Document No. EP 0 550 073 B1. In the field of so-called radar sensorics, SAR (Synthetic Aperture Radar) or even SDRS (Software-Defined Radar Sensors) are used as names in this context.

Almost identical methods have long been known in the field of medicine or ultrasonic measuring technology, under the names holography, or tomography. Descriptions of the latter methods can be found, for example, in M. Vossiek, V. Magori, and H. Ermert, "An Ultrasonic Multielement Sensor System for Position Invariant Object Identification", presented at the IEEE International Ultrasonics Symposium, Cannes, France, 1994, or in M. Vossiek, "An Ultrasonic Multi-transducer System for Position-independent Object Detection for Industrial Automation", Fortschritt-Berichte VDI, Reihe 8: Mess-, Steuerungs- and Regelungstechnik, vol. 564, 1996.

It is generally known that SA methods can be carried out with all coherent waveforms, such as in the radar range, with electromagnetic waves, and with acoustic waves, such as ultrasonic waves, or with coherent light. SA methods can also be carried out with any non-coherent waveform that is modulated with a coherent signal form.

SA methods are also used in systems in which a wave-based sensor measures a cooperative target, such as a coherently reflecting backscatter transponder. Examples and descriptions can be found in German Patent Document DE 10 2005 000 732 A1 and in M. Vossiek, A. Urban, S. Max, P. Gulden, "Inverse Synthetic Aperture Secondary Radar Concept for Precise Wireless Positioning", IEEE Trans. on Microwave Theory and Techniques, vol. 55, issue 11, November 2007, pp. 2447-2453.

The fact that signals from wave sources, whose characteristic and coherence is not known to the receiver, can be processed by way of SA methods if at least one signal is formed from at least two signals received in a spatially separated manner, which no longer describes the absolute phase but phase differences of the signals, is known, for example, from German Patent Document DE 195 12 787 A1. In this case, a signal emanating from an object or emitted by a transponder can be sensed by two receivers arranged at a known distance with respect to each other, wherein the phase difference between these two signals can be used in further evaluation. Transponder systems in the previously shown arrangement variant for which a principle explained in the following is suitable, are, for example, secondary radar systems, as they are explained, in particular, in German Patent Documents DE 101 57 931 C2, DE 10 2006 005 281, DE 10 2005 037 583, Stelzer, A., Fischer, A., Vossiek, M.: "A New Technology for Precise Position Measurement-LPM", In: Microwave Symposium Digest, 2004, IEEE MTT-S International, vol. 2, 6-11 Jun. 2004, pp. 655-658, R. Gierlich, J. Huttner, A. Ziroff, and M. Huemer, "Indoor positioning utilizing fractional-N PLL synthesizer and multi-channel base stations", Wireless Technology, 2008, EuWiT 2008, European Conference on, 2008, pp. 49-52., or S. Roehr, P. Gulden, and M. Vossiek, "Precise Distance and Velocity Measurement for Real Time Locating in Multipath Environments Using a Frequency-Modulated Continuous-Wave Secondary Radar Approach", IEEE Transactions on Microwave Theory and Techniques, vol. 56, pp. 2329-2339, 2008.

The high precision knowledge of sensing positions, that is the positions of the so-called aperture points, has turned out to be particularly problematic for implementing the SAR methods in technological products. A wavelength is about 5 cm in a 5.8 GHz radar signal. For the relative measurement of the aperture, a measuring error is needed that is substantially smaller than the wavelength of the waveform used, e.g., smaller than a tenth of the wavelength. This cannot be sufficiently achieved or can only be achieved with difficulty with technologically simple approaches, such as with simple odometers, wheel sensors, rotation sensors, so-called encoders, acceleration sensors, etc, in particular across larger movement trajectories or longer measuring times. The calculation of distance data from velocity or acceleration values entails the problem, in particular, that measuring errors integratively accumulate due to the necessary integration of measuring quantities, and the measuring errors strongly increase as the size of an integration interval increases.

A drawback of SA methods is, moreover, that SA methods usually have a very high computation overhead and an image function must be calculated both in the distance direction and in the angular direction, or in all space coordinates of the object space. The calculation is also necessary if only one coordinate, such as only one incident angle, is of interest.

In the use of known methods for distance measurement a highly precise position measurement is necessary for determining aperture points, wherein it is disadvantageously required that a measuring error of the position measurement must be substantially smaller than a wavelength of the incident wave.

SUMMARY

It is the object of various embodiments of the invention to enhance an imaging method with synthetic aperture for determining an incident angle and/or a distance of a sensor from at least one object or transponder in space, or an apparatus therefor. In particular, determination of an incident angle is to be enabled without reliance on a distance from the object or transponder.

This object is achieved by an imaging method with synthetic aperture for determining an incident angle and/or a distance of a sensor from at least one object or transponder in space with the features described below, or by an apparatus therefor with the features described below. Advantageous embodiments are also described in more detail below.

In particular, an imaging method with a synthetic aperture for determining an incident angle and/or a distance of a sensor from at least one object in space is preferred, wherein, at a number of aperture points, one respective echo profile is sensed, if one phase correction value and/or one distance correction value is calculated for each of a plurality of assumed angles as the at least one incident angle, adapted profiles are generated on the basis of the echo profiles by adapting the phase by the phase correction value for each of the assumed angles and/or by shifting the distance by the distance correction value, a probability distribution is formed for the assumed angles from the adapted profiles, and a probability value for the incident angle and/or the distance is determined from the probability distribution.

The probability distribution thus gives an indication on whether the assumed angle corresponds to the actual incident angle, or whether the distance value corresponds to the unknown actual distance.

For the assumed angles, the adapted profiles are preferably summed up or integrated. The probability distribution is formed therefrom. In particular, phase correction values and/or the distance correction values are calculated on the basis of the aperture points from the position data of the aperture.

According to a first variant, an adapted echo profile is generated as the adapted profile by adapting the phase of the echo profiles for each assumed angle by the phase correction value and/or shifting the distance by the distance correction value.

By summing up or by determining maxima, the probability function can be separated into one-dimensional probability functions. It is thus possible, in particular, to form probability functions independently from each other, also for only the angle determination or for only the distance determination.

Preferably a number of phase velocity profiles are formed from the echo profiles, and phase angle velocities are determined as their argument. Their phase characteristic advantageously provides an indication on a distance change, or a radial velocity. The number can be created by considering directly adjacent echo profiles, each time, principally, however, by any other combinations of non-adjacent echo profiles.

Preferably the at least one angle assumed as the incident angle is calculated in dependence on a relative movement velocity between the wave-based sensor and the object and, in each case, one complex phase correction value is calculated as a correction in dependence on a phase variation based on a velocity difference. This enables the comparison of data from a velocity sensor system instead of data from a distance sensor system. In this way, the otherwise high aperture sensor system requirements are advantageously made less demanding.

Preferably, for each assumed angle, the phase corrected phase velocity profiles are summed up or integrated to form velocity probability density functions. Their real portion, in particular, gives an indication on whether the assumed angle corresponds to the actual incident angle.

A method is preferred, in particular, wherein the at least one angle assumed as the incident angle is calculated in dependence on a relative acceleration between the wave-based sensor and the object, and, in each case, one complex phase correction value is calculated as a correction in dependence on a phase variation based on an acceleration difference. This enables a comparison of data of a velocity sensor system instead of data of a distance sensor system. In this way, the otherwise high aperture sensor system requirements are advantageously made less demanding. A determination of the incident angle is made possible, in particular, also without relying on the distance. The particular advantage of the acceleration-based method is that in practice it is much easier to measure accelerations with small drift errors than velocities or distances. This advantage can be implemented, in particular, in hand-held radio systems.

Herein, a number of phase acceleration profiles can be formed from the echo profiles and a vectorial acceleration can be determined as their argument. Their phase characteristic advantageously gives an indication on velocity changes or radial accelerations. In particular, for each assumed angle, the phase corrected phase acceleration profiles can be summed up or integrated to form an acceleration probability distribution. In particular, their real portion gives an indication on whether the assumed angle corresponds to the actual incident angle.

Herein, an analytical calculation of the extreme values of the one-dimensional acceleration probability distribution or of the zero crossing of the phase of the one-dimensional acceleration probability distribution can be carried out. This results in a substantial reduction of the computation overhead. The thus possible determination of the incident angle and the distance on the velocity and acceleration level has the advantage that the systematic errors accumulating over time and/or distance, of the relative sensor system, have no weight or have considerably less weight, and the uniqueness range is increased.

For sensing the echo profile, a signal can be transmitted from the sensor to the at least one object, and the at least one object in space includes a transponder, or is configured as a transponder, which receives the signal and, in dependence on the signal, transmits a modified signal as a signal coming from the object, back to the sensor, which is used as a signal received in the sensor as the echo profile.

As an independent aspect, an apparatus is advantageous with a wave-based sensor for sensing a sequence of echo signals of an object, and with a logic and/or with a processor accessing at least one program as a controller, wherein the logic and/or the processor are configured for carrying out such an advantageous method for determining an incident angle and/or a distance of a sensor from at least one object in space.

In particular, such an apparatus is equipped with a memory or an interface to a memory, wherein the program is stored in the memory. In a manner known as such, such an arrangement can comprise hardware components as the logic, which can be adapted for running necessary programs via suitable wiring or an integrated structure. The use of a processor including a processor of a computer connected, for example, via an interface, can also be implemented for carrying out a suitable program that is stored in an accessible manner. Combined approaches of fixed hardware and a processor are also possible. The object can comprise a transponder or be configured as a transponder.

DESCRIPTION OF THE DRAWINGS

An advantageous embodiment will be explained in the following with reference to the drawing in more detail, wherein.

DETAILED DESCRIPTION

Figure 1:
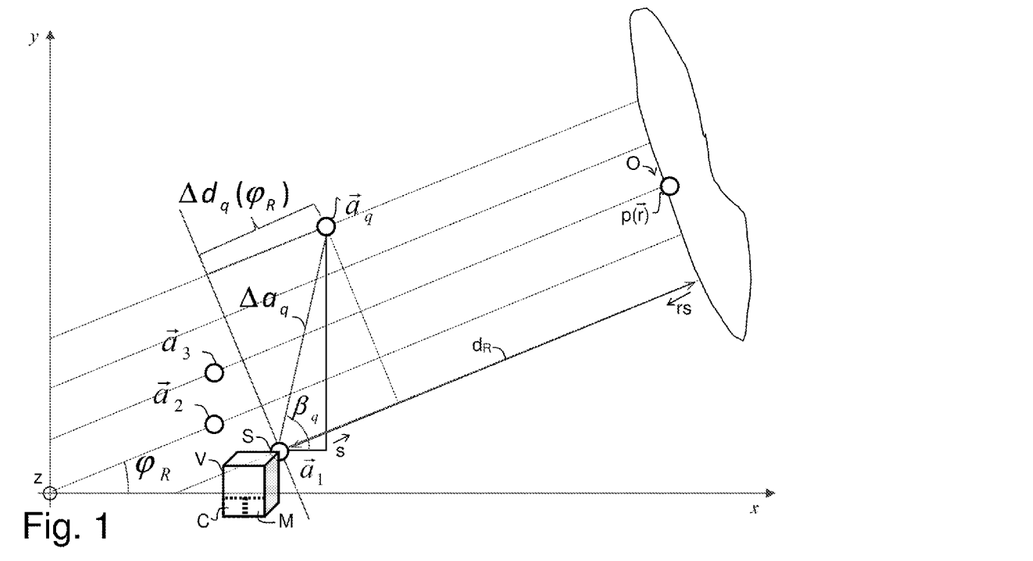
FIG. 1 shows an exemplary measuring arrangement.

As can be seen in FIG. 1, a signal s is transmitted by an apparatus V by way of a signal source. The transmitted signal s is reflected on an object O at a distance from the sensor S. The signal reflected by the object O propagates as a signal rs coming from the object O in the direction toward a sensor S. The sensor S is preferably arranged or formed in or on the apparatus V, which also comprises the signal source. Preferably the apparatus will be configured both as a transmitter and a receiver, so that, in terms of tolerances, an identical location can be assumed for the transmitter and the receiver.

This arrangement is present in a space that can be defined by any reference coordinate system. A Cartesian coordinate system with orthogonal space coordinates x, y, z is shown for illustrative purposes only. An imaginary connecting line, along which the signal S or its wave propagates to the object O and along which the signal rs or its wave coming from the object O propagates, extends at an oblique angle to the extension of the space coordinates, wherein, for simplicity, only two of the Cartesian space coordinates x, y are shown. This angle thus corresponds to an incident angle $\phi_R$ of the planar waves with respect to the reference coordinate system.

Optionally, the signal rs coming from the object O can also come from an actively transmitting transponder, which is arranged on the object O or which is present as the object O itself at the position of such an object O. Preferably, the object O can thus have a transponder or be configured as a transponder.

For deriving a preferred approach, a classical SAR aperture is assumed, for example, as it is shown in FIG. 1. Only for purposes of simplified explanation and without excluding a generalization, the following assumptions are made for further applications:

The object O is present at an object position $p(\vec{r})$ wherein $\vec{r}=(x,y)$ as a radial space coordinate in the Cartesian coordinate system.

A number of Q measurements at Q aperture points $\vec{\alpha}_q=(x_{aq},y_{aq})^T$ is carried out with the aid of the sensor S in the direction toward the object O (wherein q=1, 2, ..., Q).

Each of the Q measurements results in an echo profile $sig_q(d)$ as a measuring system with, for example, in the case of a single object O, a distance d as an instantaneous object distance of the object from sensor S. These echo profiles $sig_q(d)$ should have complex values, so that the following applies:

$$sigq(d)=|sigq(d)|e^{j \cdot arg\{sigq(d)\}},$$

wherein $arg\{sig_q(d)\}$ is a phase angle $\phi_q(d)=arg\{sig_q(d)\}$ of the complex signal, i.e. of the echo profile $sig_q(d)$ having complex values. Expressed in a generalized manner, an echo profile $sig_q(d)$ is comprised of a plurality of received signals, which have propagated from one or more objects O not only via one respective direct path, but as the case may be, also via indirect paths and thus different signal paths to the sensor S arriving at a delayed time.

If the measuring signals have real values, they are preferably to be extended to signals having complex values by way of a Hilbert transformation.

The object O should be so far removed from the synthetic aperture that it can be expected that the wave emitted by the object O can be assumed as a planar wave at the location of the aperture. The assumption of planar waves is valid if a distance $d_R$ between the sensor S and the object O corresponds to a minimum distance, which allows a parallel wave characteristic to be approximated from the point of view of a plurality of measuring positions.

This condition can be deemed as fulfilled if a change in the distance of the transmission path from the sensor S to the object O, which is due to a lateral distance $\Delta d_q(\phi_R)$ of the aperture points $\vec{\alpha}_q=(x_{aq},y_{aq})^T$ transverse to the wave propagation direction, is small with respect to a wavelength $\lambda$ of the signal s, rs, i.e. if the following applies:

$$\sqrt{d_R^2(\Delta\alpha_q \cdot \sin(\beta_q-\phi_R))^2}-d_R \ll \lambda,$$

wherein $\Delta\alpha_q$ is an actual distance between aperture points $\vec{\alpha}_1, \vec{\alpha}_q$ with respect to each other and $\beta_q$ is a reference angle for these aperture points $\vec{\alpha}_1, \vec{\alpha}_q$, between the Cartesian coordinate system and any reference coordinate system, in which the incident angle $\phi_R$ of the planar wave is considered.

A distance from the first aperture point d, to the object O at the object position $p(\vec{r})$ with $\vec{r}=(x,y)^T$ is chosen as a reference distance $d_R$ from object O to the aperture. Basically, however, the choice is arbitrary. Thus the following applies:

$$d_R=\sqrt{(x_{a1}-x)^2+(y_{a1}-y)^2}.$$

Based on this assumption, a reconstruction formula is derived:

From the assumption with respect to a planar wave propagation, it follows that a distance change as the lateral distance $\Delta d_q(\phi_R)$ of the transmission path from the sensor S to the object O, because of the movement of the sensor 0 from the first aperture point $\vec{\alpha}_1$ to the last aperture point $\vec{\alpha}_q$, is no longer dependent on the instantaneous distance d to the object O but only on the positions of the aperture points $\vec{\alpha}_1, \vec{\alpha}_q$ and the incident angle $\phi_R$ of the planar wave. The following relationships thus apply:

$$\Delta a_q = \sqrt{(x_{aq}-x_{a1})^2+(y_{aq}-y_{a1})^2}$$

$$\Delta d_q(\varphi_R) = \Delta a_q \cdot \cos(\beta_q-\varphi_R)$$

$$\cos(\beta_q) = \frac{x_{aq}-x_{a1}}{\Delta a_q}$$

with $\Delta_q, \beta_q$ can be determined and derived in a manner mathematically known as such with methods for distance determination. In the following, a simplification of the method for the separate computation of the incident angle and the distance will be shown.

The incident angle $\phi_R$ is an initially unknown angle, at which the target, here the object O from the point of view of the sensor S, is seen. The assumed angle $\phi_{RA}$, introduced in the following, is an assumed angle, wherein the assumed angle $\phi_{RA}$ is an arbitrary assumption whose plausibility is then tested in the following.

Consequently, at first, the unknown incident angle $\phi_R$ is to be determined. This problem is solved by taking measuring values of a wave-based sensor system together with measuring values of a movement sensor system, i.e. the measuring values of a position sensor system or a velocity sensor system or an acceleration sensor system for several assumed angles $\phi_{RA}$, and the plausibility is tested via these algorithms, whether or not the angle hypothesis is true for this assumed angle $\phi_{RA}$. Several advantageous methods for solving this problem will be presented in the following.

Based on the assumptions mentioned and with the aid of the geometric relationships, a sum profile can be formed from the number Q of all measured complex-valued echo profiles $sig_q(d)$ for each assumed angle $\phi_{RA}$. For this purpose, at first, in a shifting step, each signal, or echo profile $sig_q(d)$ is shifted by an amount of an assumed lateral distance $-\Delta d_q(\phi_{RA})$, thus shifted echo profiles $$sig_q(d,\phi_{RA})=sig_q(d-\Delta d_q(\phi_{RA}))$$

are formed.

This shifting step can be dispensed with, if it is true that $c/B >> \Delta d_q(\phi_{RA})$, with B as the measuring signal bandwidth of the signals s, rs, and c as the propagation velocity of the signals s, rs or the wave. This also applies if the width of an echo signal envelope of a single echo peak, or a single measuring path of such an object O is substantially greater than the assumed lateral distance $\Delta d_q(\phi_{RA})$ or, in other words substantially greater than the shift of echoes of the signal S on the object O, which is due to the movement of the sensor S from the aperture point $\vec{\alpha}_q$ to the aperture point $\vec{\alpha}_{q+1}$, which is sometimes the case with small synthetic apertures.

In a subsequent phase adaptation step, the phases of the shifted signals, or the shifted echo profiles $sig_q(d,\phi_{RA})$ are adapted to a changed delay, to result in adapted echo profiles $$sig_q(d,\phi_{RA})''=sig_q(d,\phi_{RA})' \cdot e^{-j \cdot f(\Delta d_q(\phi_{RA}))}.$$

The function $f(\Delta d_q(\phi_{RA}))$ describes a linear relationship between a signal phase change in dependence on the instantaneous distance $d_q$ of the aperture point $\vec{\alpha}_q$ to the object O. The following applies:

$$f(\Delta d_q(\varphi_{RA})) = const. \cdot \frac{\omega}{c} \Delta d_q(\varphi_{RA}) = const. \cdot \frac{2\pi}{\lambda} \Delta d_q(\varphi_{RA}),$$

wherein $\omega$ is a circle center frequency of the waveform used, i.e. the signals s, rs, and c* is the phase velocity and const. is a real-value constant that depends on each measuring principle. In the time-of-arrival method, known as such, this constant has, for example, the value 1, whereas for primary radars which determine the so-called round-trip-time-of-flight, it has the value 2, and for quasi phase coherent systems a value of 4 resulted.

By summing up the Q phase-corrected or adapted echo profiles $sig_q(d,\phi_{RA})''$ in a summing step, a sum profile sumsig $(d,\phi_{RA})$ can be calculated based on all aperture points $\vec{\alpha}_q$ for each space direction, or for each assumed angle $\phi_{RA}$, according to:

$$sumsig(d, \varphi_{RA}) = \sum_{q=1}^{Q} sig_q(d, \varphi_{RA})''$$

This is thus a two-dimensional image function, wherein the amount $$W(d,\phi_{RA})=|sumsig(d,\phi_{RA})|$$

is a measure for the probability $W(d,\phi_{RA})$ that an object O is present at the location $(d,\phi_{RA})$. If a real object O is thus at the position $(d,\phi_R)$, the function of the measure for the probability $W(d,\phi_{RA})$, at least if there have been no other interferences in the measurement, has a maximum at the position $(d=d_R, \phi=\phi_R)$. By the position of the maxima in the image function, thus both the unknown incident angle of the planar wave $\phi_R$ and the unknown distance $d_R$ from objects O or transponders as objects O can be determined.

In summary, a first advantageous method, also illustrated in FIG. 2, can be described as follows:

In a first step S1, basic parameters are set, such as the serial index q for 1, 2, ..., Q is set at the value 0. In a second step S2, the value of the serial index q is incremented by 1.

In a third step S3, the sensor S is moved to the aperture point $\vec{\alpha}_q$ corresponding to the instantaneous serial index q. In the next step S4, a measurement is carried out at this aperture point $\vec{\alpha}_1$. As long as the serial index q is smaller than the maximum, or setpoint number of aperture points $\vec{\alpha}_q$, the process jumps back to second step S2 in a step S5.

In this manner, in the first steps S2-S5, measurements are carried out at a number Q of different aperture points $\vec{\alpha}_q$. Herein, the positions of the aperture points $\vec{\alpha}_1$ are detected or determined by way of a position sensor system, unless the positions of the aperture points $\vec{\alpha}_q$ are not known a priori. In the present case, the term aperture points $\vec{\alpha}_q$ is used synonymously to the position of a measurement of the individual points of the aperture.

Each of the Q measurements results in an echo profile $sig_q(d,\phi_R)$, or is stored as such.

For several angles $\phi_{RA}$ as incident angles, in a following step S6, one distance correction value $\Delta d_q(\phi_{RA})$ and one phase correction value $f(\Delta d_q(\phi_{RA}))$ is created based on the aperture point data, i.e. the position data of the aperture, which are calculated, for example, from data of a position sensor system. Optionally, the entire angular range is scanned in a grid and calculated for the angle $\phi_{RA}$.

The choice of the assumed angles $\phi_{RA}$ can be arbitrary, wherein an equidistant angular spacing is used across a space range of interest.

Each echo profile $sig_q(d,\phi_R)$ is adapted for each assumed angle $\phi_{RA}$ at least with respect to the phase with the phase correction value $f(\Delta d_q(\phi_{RA}))$, and if necessary, also shifted with respect to the distance with the distance correction value $\Delta d_q(d,\phi_{RA})$, and thus a phase corrected, or adapted echo profile $sig_q(d,\phi_{RA})''$ is formed in a subsequent step S7.

In a subsequent step S8, all such phase corrected echo profiles $sig_q(d,\phi_{RA})''$ are summed up for each of the angles $\phi_{RA}$ assumed as the incident angles, and an image function, or a probability distribution is derived, that gives an indication on whether the assumed angle $\phi_{RA}$ corresponds to the actual incident angle $\phi_R$ or on which distance value d corresponds to the unknown distance $d_R$.

If it is assumed that two objects O are not at the same distance or at the same incident angle $\phi_R$ in the object scene, in a subsequent step S9, this two-dimensional function can be separated into two one-dimensional functions, to arrive at $$W(\varphi_{RA}) = \max_d |sumsig(d, \varphi_{RA})|$$

or else $$W(\varphi_{RA}) = \left| \int_{d=0}^{d_{max}} sumsig(d, \varphi_{RA}) d d \right|.$$

as a measure for the probability $W(\phi_{RA})$ of the incident angle $\phi_R$, or:

$$W(d) = \max_{\varphi_{RA}} |sumsig(d, \varphi_{RA})|$$

or else $$W(d) = \left| \int_{\varphi_R=0}^{360} sumsig(d, \varphi_{RA}) d\varphi_{RA} \right|$$

as a measure for the probability $W(d)$ for the instantaneous distance d to the object O. In a subsequent step S10, the incident angle $\phi_R$ or the instantaneous distance d are thus determined.

If it is now assumed that the echo profiles $sig_q(d)$ measured for the distance and thus also the sum profile $sumsig(d,\phi_{RA})$ are discrete scanning signals, the integral transitions to a simple sum. Under the assumption that the echo profiles $sig_q(d,\phi_R)$ are represented by N scanning points in each case in the distance range from, for example, 0 to $d_{max}$, the following applies:

$$W(\varphi_{RA}) = \max_{n=1 \ldots N} |sumsig(d_n, \varphi_{RA})|$$

or else $$W(\varphi_{RA}) = \left| \sum_{n=1}^{N} sumsig(d_n, \varphi_{RA}) \right|$$

$$= \left| \sum_{n=1}^{N} \sum_{q=1}^{Q} sig_q(d_n - \Delta d_q(\varphi_{RA})) e^{-j \cdot f(\Delta d_q(\varphi_{RA}))} \right|.$$

This term is particularly advantageous if a biunique determination of the distance $d_n$, such as with RFID systems, is not possible due to a small uniqueness range of the carrier wave. However, it is then possible with the aid of the above-described method, only to estimate the angle, at which the RFID tag (radio frequency identification tag) is seen as a transmission point of the signal rs coming from the object O, without having to calculate the precise distance.

Figure 2:
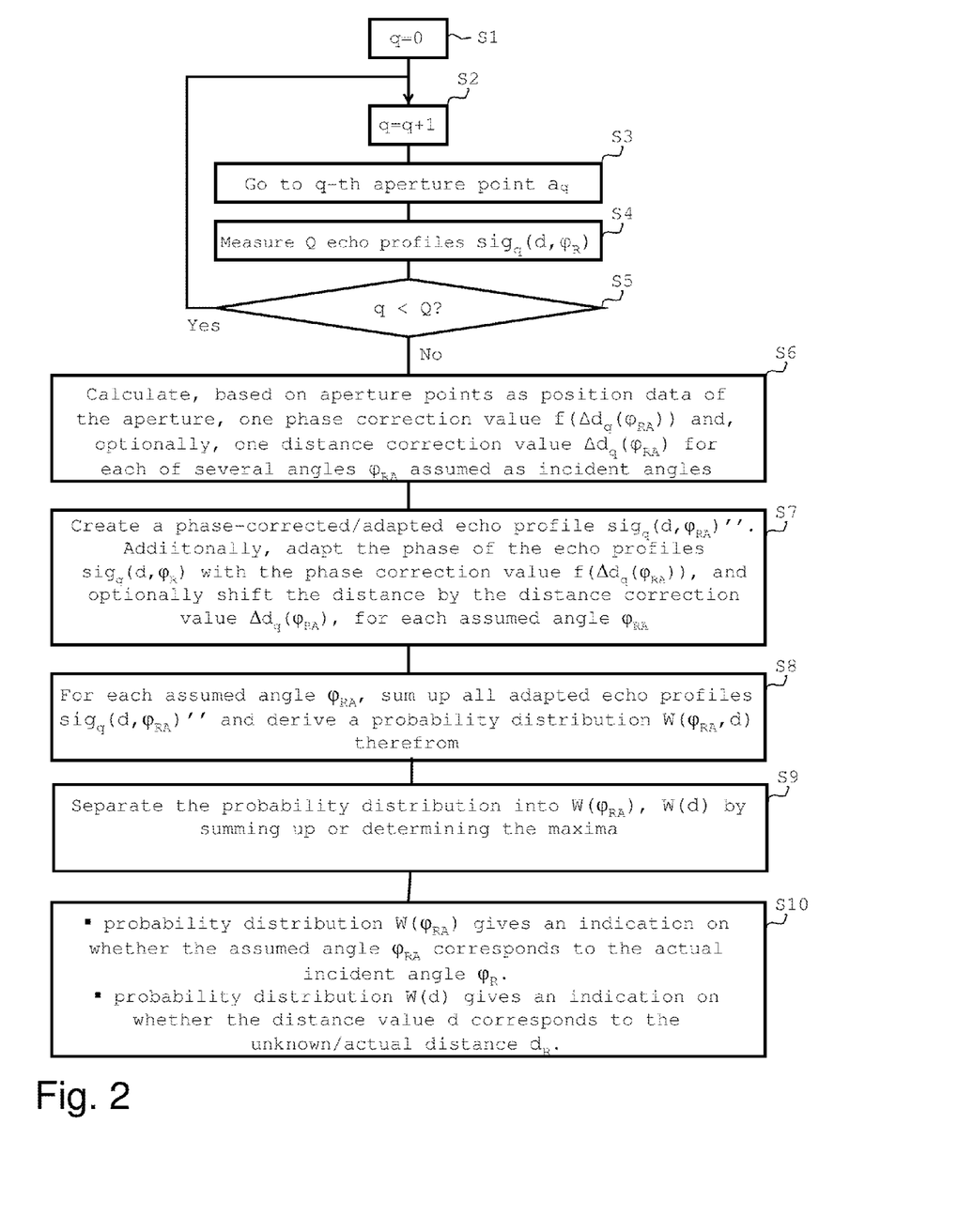
FIG. 2 shows an exemplary method step sequence for an imaging method with synthetic aperture for determining an angle and a distance of an object.
Figure 3:
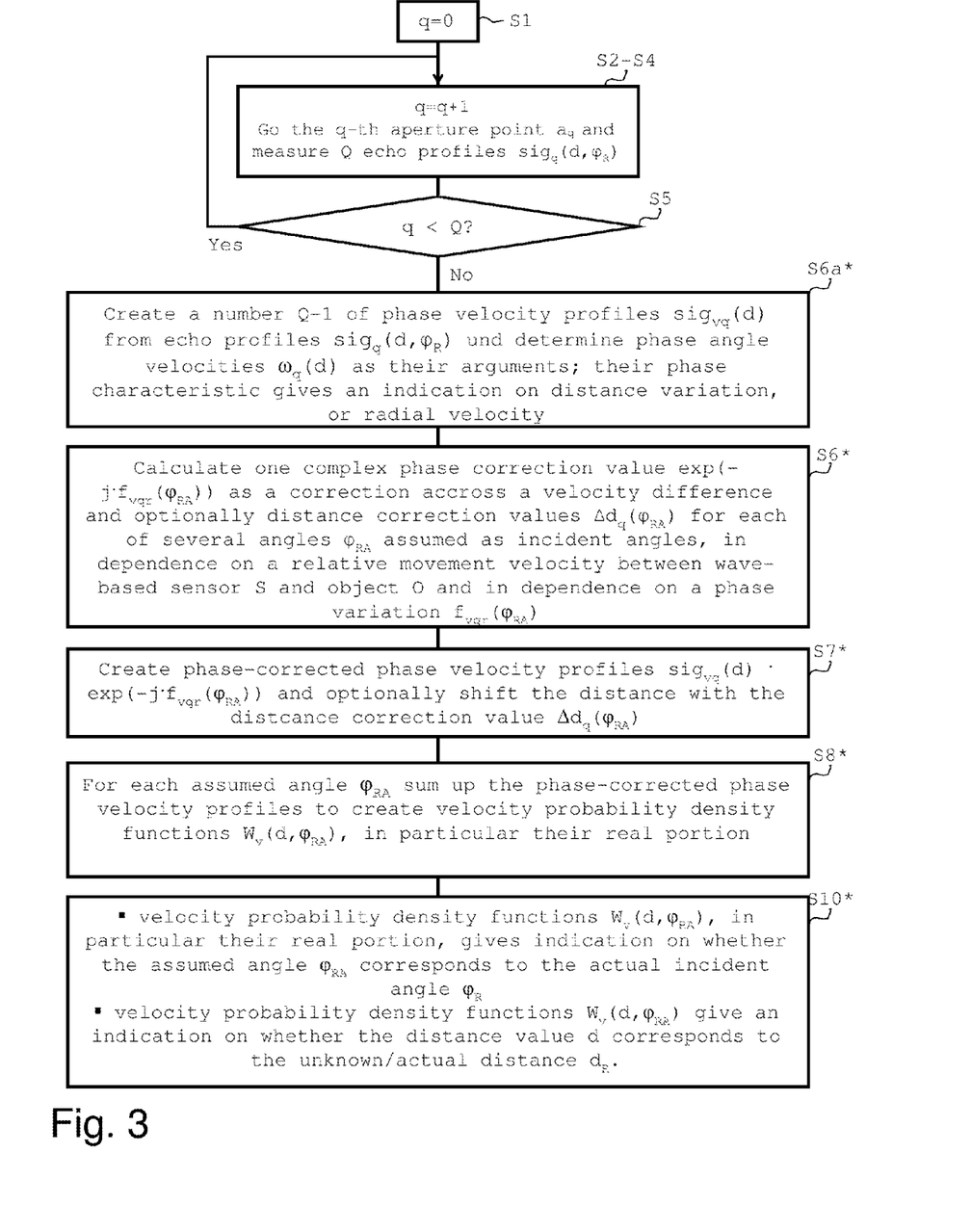
FIG. 3 shows a preferred sequence of method steps for an imaging method for determining an angle and a distance of an object.

FIG. 3 shows a particularly preferred sequence of method steps, wherein phase velocity profiles $sig_{vq}(d)$ are formed from the echo profiles $sig_q(d)$, and evaluated. Herein, the first method steps S1-S5 are identical to the sequence of method steps according to FIG. 2.

Under the assumption that the angle range covered by the assumed angle ($P_{RA}$ is subdivided in K discrete angle values $\phi_{RAK}$, the following applies:

$$W(d) = \max_{k=1 \ldots K} |sumsig(d, \varphi_{RAk})|$$

or else $$W(d) = \left| \sum_{k=1}^{K} sumsig(d, \varphi_{Rk}) \right|.$$

However, a very precise position measurement is not needed, at least if the preferred embodiment according to FIG. 2 is applied for determining the aperture points in the present case. In particular, it is not absolutely necessary that the measuring error of the position measurement be significantly smaller than the wavelength of the incident wave.

It is now possible, from the number Q of echo profiles $sig_q(d)$, the phase characteristic of which is usually a linear function of the distance d, to form a number Q−1 of phase velocity profiles $sig_{vq}(d)$, the phase characteristic of which gives an indication on the distance change, i.e. on the radial velocity. The phase velocity profiles $sig_{vq}(d)$ are formed in a step S6a*, by forming the difference of two echo profiles $sig_q(d)$, $sig_{q-1}(d)$ for each phase value, and by multiplying it with the amplitude of the distance value. The two echo profiles $sig_q(d)$, $sig_{q-1}(d)$ are preferably, but not necessarily, two adjacent echo profiles $sig_q(d)$, $sig_{q-1}(d)$. Any difference pairs can be formed for this purpose, while adjacent ones will be used in the following explanations, by way of example. A phase angle velocity $\phi_q(d)$ or, in other words, the argument $\arg\{sigv_q(d)\}$ of the phase velocity profiles $sig_{vq}(d)$, results in:

$$\omega_q(d) = \frac{\varphi_q(d) - \varphi_{q-1}(d)}{\Delta T_q},$$

wherein $\Delta T_q$ is a time interval having elapsed between a measurement having the index q−1 and a measurement having the index q at the two aperture points $\vec{\alpha}_{q-1}$ and $\vec{\alpha}_q$, respectively. If the measurements are made at constant time intervals, $\Delta T_q$ is constant.

The phase velocity profiles $sig_{rq}(d)$ can preferably be calculated as follows:

$$h_{vq}(d) = sig_q(d) \cdot sig_{q-1}(d)^*,$$

wherein the phase angle velocity results in:

$$\omega_q(d) = \frac{\arg\{h_{vq}(d)\}}{\Delta T_q}$$

and the phase velocity profiles $sig_{vq}(d)$ are defined as $$sig_{vq}(d) = |h_{vq}(d)| \cdot e^{j \cdot \omega_q(d)}.$$

To avoid squaring of the signal amplitudes, the following could also be formulated:

$$sig_{vq}(d) = \sqrt{|h_{vq}(d)|} \cdot e^{j \omega_q(d)}$$

or $$sig_{vq}(d) = |sig_q(d)| \cdot e^{j \omega_q(d)}$$

or $$sig_{vq}(d) = |sig_{q-1}(d)| \cdot e^{j \omega_q(d)}$$

or $$sig_{vq}(d) = \frac{1}{2}(|sig_{q-1}(d)| + |sig_{q-1}(d)|) \cdot e^{j \cdot e^{j \omega_q(d)}}.$$

The concrete characteristic of the contributions is not critical, for further processing, so that other combinations or even constant or arbitrarily assumed amounts could also be used. The five previously shown variants are physically applicable and therefore to be understood as a preferred exemplary embodiment.

Advantageously, a holographic reconstruction is to be carried out on the basis of the phase velocity profiles, where it is no longer necessary to determine the position of the aperture points $\vec{\alpha}_q$, but wherein it is sufficient to measure the relative movement velocity between the wave-based sensor S and the object O. This preferred modification of the previously described and already advantageous method, is a considerable simplification in the practical implementation of synthetic apertures, since it is much easier in practice, to measure velocities with slight drift errors, than distances.

The sensor S and the object O now move relative to each other at a vectorial velocity $\vec{v}_q = |\vec{v}_q| \cdot e^{j\Delta\beta_q}$ from the q−1-th aperture point $\vec{\alpha}_{q-1}$ to the q-th aperture point $\vec{\alpha}_q$ with q=2, . . . Q, wherein an angle $\Delta\beta_q$ describes the angle of movement relative to the chosen reference coordinate system between two adjacent aperture points $\vec{\alpha}_{q-1}$ to the q-th aperture point $\vec{\alpha}_q$, i.e.:

$$\cos(\Delta\beta_q) = \frac{x_{a,q} - x_{aq-1}}{|\vec{a}_q - \vec{a}_{q-1}|}.$$

The velocity vector $\vec{v}_q$ can be sensed by a sensor system, such as the velocity amount by a wheel encoder, and the direction via a steering angle sensor in a vehicle. A velocity component $v_{qr}$ in the direction of the incident angle $\phi_R$ is now the quantity that is reflected in a characteristic manner in the phase velocity profiles $sig_{vq}(d)$ in the phase angle velocity $\omega_q(d)$. Thus, for the radial velocity component $$v_{qr} = |\vec{v}_q| \cdot \cos(\Delta\beta_q - \varphi_R) \text{ with } \Delta\beta_q = \arg\{\vec{v}_q\}.$$

A phase variation $f_{vqr}(\phi_{RA})$ i.e. a phase angle velocity $\omega_q(d)$ in the phase velocity profiles $sig_{vq}(d)$ to be expected due to the measurement of the velocity $v_{qr}$ depending on each assumed incident angle $\phi_{RA}$, is linked with the radial velocity $v_{qr}$ via a real-value constant $const_v$, and for the phase variation $f_{vqr}(\phi_{RA})$:

$$f_{vqr}(\phi_{RA}) = Const_v \cdot v_{qr}.$$

The constant $const_v$ depends on the wavelength λ and each chosen measuring principle. When a primary radar or an ultrasonic impulse echo system is used, for example, $$const_v = \frac{4\pi}{\lambda}$$

applies in analogy to the previous relationship with respect to the formula of the location change. In a step S6*, in a corresponding manner, a corresponding phase variation fvqr(φRA) and, therefrom, a complex phase correction value exp(−j·fvqr(φRA)) are determined.

Based on these phase velocity profiles $sig_{vq}(d)$, in steps S7* and S8*, now, a new preferred reconstruction prescription can be defined for calculating an image function, or a probability density function $W_v(d,\phi_{RA})$, as follows:

$$W_v(d, \varphi_{RA}) = \sum_{q=1}^{Q} sig_{vq}(d) \cdot e^{-j \cdot f_{vqr}(\varphi_{RA})}.$$

This velocity probability density function $W_v(d,\phi_{RA})$ is not as easily interpreted in each case as the probability density function that was defined with the aid of the echo profiles.

In further steps S10*, the actual incident angles are then determined as follows.

For reconstruction, for each assumed angle $\phi_{RA}$, each phase velocity profile $sig_{vq}(d)$ is now multiplied by each complex phase correction value $exp(-j \cdot f_{vqr}(\phi_{RA}))$, and then all Q−1 thus phase corrected phase velocity profiles are summed up. The complex phase correction value results, as shown above, from the measured velocity v and the assumed angle $\phi_{RA}$ relative to the chosen reference coordinate system. If the assumed angle $\phi_{RA}$ corresponds to the actual angle to the object O, and the complex phase correction value of each complex phase correction value offsets precisely that phase value of the phase velocity profiles $sig_{vq}(d)$ that is the phase angle velocity $\omega_q(d)$ so that all Q complex values are superimposed in sum for each distance d in a constructive manner. In particular, in this case, the phase angle of the resulting complex pointer in the form of the velocity probability density function $W_v(d,\phi_{RA})$, at least if the velocity measurement is precise, is identical to zero. The imaginary portion of the velocity probability density function $W_v(d,\phi_{RA})$, in this case, would be zero, and the real portion at a maximum.

If, however, the assumed angle $\phi_{RA}$ does not correspond to the actual incident angle $\phi_R$, the phases of the Q complex values are randomly distributed at curvilinear apertures in sum for each distance d. The pointers, or complex values, in the form of the velocity probability density function $W_v(d, \phi_{RA})$ are thus not constructively superimposed, and the amount of the sum is substantially smaller than with the constructive superposition. With straight-line apertures, at least the phase angle of the velocity probability density function $W_v(d,\phi_{RA})$ is not equal to zero, and the real portion of the sum of the velocity probability density function $W_v(d,\phi_{RA})$ is substantially smaller in the case in which the assumed angle corresponds to the actual angle to the object.

For calculating an image function, the real portion of the velocity probability density function $W_v(d,\phi_{RA})$ is preferably used:

$$W_v(\varphi_{RA}) = Re\left\{\sum_{q=1}^{Q} sig_{vq}(d) \cdot e^{-j \cdot f_{vqr}(\varphi_{RA})}\right\}$$

A different embodiment of the evaluation can reside in calculating the angle function $$W_v(\varphi_{RA})|_{d=d_0} \sum_{q=1}^{Q} sig_{vq}(d_0) \cdot e^{-j \cdot f_{vqr}(\varphi_{RA})}$$

for a particular distance $d_0$ and determining the assumed angle $\phi_{RA}$ in the function $W_v(\phi_{RA})|_{d=d_0}$, for which the phase angle, that is the argument of $W_v(\phi_{RA})|_{d=d_0}$ becomes minimal and thus $$arg\{W_v(\phi_{RA}|_{d=d_0}\} = \min$$

In this case, in terms of probability, the assumed angle $\phi_{RA}$ should correspond to the actual incident angle $\phi_R$.

A sensible assumption for the distance $d_0$ can often be very simply determined by determining the maximum amounts in at least one of the sensed or determined distance or velocity profiles, which are associated with certain object distances.

Figure 4:
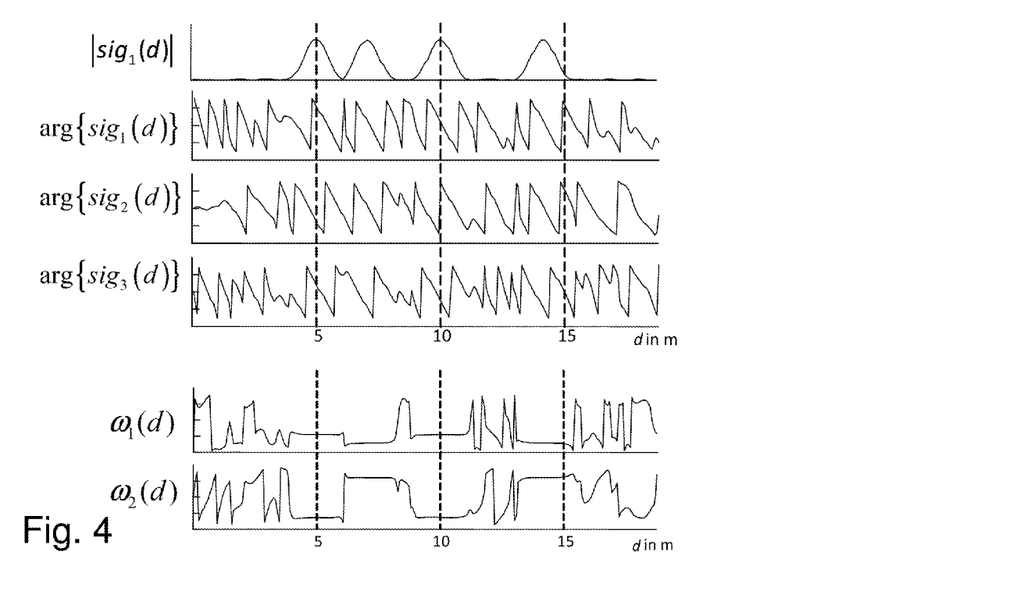
FIG. 4 shows exemplary signal characteristics in the context of carrying out this preferred sequence of method steps.

In FIG. 4, the relationships can be easily recognized. Plotted over the distance in meters, there is an amount of an exemplary first echo profile $sig_1(d)$ with 4 echoes, i.e., 4 objects O or 4 transponders, in the first line, wherein the measurement was carried out at a first aperture point $\vec{\alpha}_1$. The distances d of the objects O from the sensor S can be easily recognized with reference to the position of the maxima in the amount of the echo profile.

In the second line, the phase $\arg\{sig_1(d)\}$ of the first echo profile $sig_1(d)$ is shown. In the third and fourth lines, the phases $\arg\{sig_2(d)\}$, $\arg\{sig_3(d)\}$ of a second echo profile $sig_2(d)$ sensed at a second aperture point $\vec{\alpha}_2$, and a third echo profile $sig_3(d)$ sensed at a third aperture point $\vec{\alpha}_3$ are shown, respectively.

From the phases of the echo profiles sig(d), the phase angle velocities $\omega_1(d)$, $\omega_2(d)$ can then be derived in the manner described above. The phase angle velocity $\omega_1(d)$ shown in the fifth line is determined from the difference of the phases of the first echo profile $sig_1(d)$ and the second echo profile $sig_2(d)$. The phase angle profile velocity $\omega_2(d)$ shown in the sixth line is determined from the difference of the phases of the second echo profile $sig_2(d)$ and the third echo profile $sig_3(d)$.

A characteristic of the determined phase angle velocities $\omega_1(d)$, $\omega_2(d)$, extremely useful in practice, is that they are almost constant over the entire echo width, as can be clearly seen in FIG. 2. A very rough, or very imprecise detection of an object distance $d_0$ is thus sufficient to be able to carry out a correct incident angle determination according to the method shown. The angle measurement precision is thus not directly linked to the distance measuring precision.

The two-dimensional function of the velocity probability density functions $W_v(d,\phi_{RA})$ can be transferred into a one-dimensional function, if (a) either a curvilinear aperture is present and it is assumed that two objects O are not at the same distance d or at the same actual incident angle $\phi_R$ in the object scene, or if (b) only one object O is in the sensing range.

Under the assumption that the phase velocity profiles $sig_{vq}(d)$ are represented in each case in the distance range from, for example, 0-$d_{max}$ by N scanning points, this one-dimensional probability function $W_v(\phi_{RA})$ can be calculated, for example, according to $$W_v(\varphi_{RA}) = \sum_{n=1}^{N} \sum_{q=1}^{Q} sig_{vq}(d_n) \cdot e^{-j \cdot f_{vqr}(\varphi_{RA})}.$$

The incident angle(s) $\phi_R$ at which objects O are actually present, can be recognized by the fact that the real portion of the one-dimensional probability function $W_v(\phi_{RA})$ becomes maximal, or the phase angle becomes minimal when the one-dimensional probability function $W_v(\phi_{RA})$ has a large value at the same time.

In practice, the velocity $|\vec{v}_q|$ of the sensor S and the angle $\Delta\beta_q$ of the movement can be determined with the aid, for example, of an odometer and an angle sensor, such as a steering angle sensor, a compass or a gyroscope. With angle sensors measuring relatively and not absolutely, the angle value must be successively tracked from aperture point $\vec{\alpha}_q$ to aperture point $\vec{\alpha}_{q+1}$. With an absolutely measuring angle sensor system, it is sufficient to relate each angle value to a predefined common point of origin, such as the angle position at the first aperture point $\vec{\alpha}_1$. A pure estimation of the angular position with respect to systems at an unknown or non-biunique distance, for which only the velocity must be known, can also be advantageously implemented.

If the moving objects O are vehicles, it can be assumed very often, for example, if the turning circle of the vehicle is great compared to the aperture, that the angle $\Delta\beta_q$ of the movement is constant, and therefore does not need to be measured. The reference coordinate system would thus be sensibly defined by the normal rolling direction of the wheels. For example, the x axis of the reference coordinate system is assumed to be fixed in the vehicle rolling direction.

Depending on the vehicle, it can also be suitable to assume that the velocity $|\vec{v}_q|$ is constant during the Q measurements, as is described in the following.

As an extension of the explanations above, a number Q-2 of phase acceleration profiles $sig_{aq}(d)$ can also be formed, for example, from the number Q of the echo profile or the number Q-1 of the phase velocity profiles. The phase acceleration profiles $sig_{aq}(d)$ give an indication on the change in velocity, i.e. on the absolute radial acceleration of the sensor S. The phase angle acceleration $\alpha_q(d)$ as the argument of the phase acceleration profile $sig_{aq}(d)$ now results in $$\alpha_q(d) = \frac{\omega_q(d) - \omega_{q-1}(d)}{\Delta T_q}.$$

The phase acceleration profiles $sig_{aq}(d)$ can be calculated, in analogy to the previous explanation for the phase velocity profile $sig_{vq}(d)$, preferably as follows:

$$h_{aq}(d) = sig_{vq}(d) \cdot sig_{vq-1}(d).$$

and $$sig_{aq}(d) = |h_{aq}(d)| \cdot e^{j \cdot \alpha_q(d)}$$

with the phase angle acceleration:

$$\alpha_q(d) = \frac{\arg\{h_{aq}(d)\}}{\Delta T_q}.$$

The phase acceleration profiles $sig_{aq}(d)$ can of course also be established, just like the phase velocity profiles $sig_{vq}(d)$ with respect to the amount in an unsquared manner, and the other remarks with respect to the amounts apply in the same way.

The sensor S and the object O now move relative to each other at the acceleration vector $\vec{\alpha}_q = |\vec{\alpha}_q| \cdot e^{j\Delta\beta_q}$, wherein the angle $\Delta\beta_q$ describes the angle of the acceleration vector relative to the chosen reference coordinate system.

The acceleration vector $\vec{\alpha}_q$ can be sensed, for example, by a sensor system, for example by Micro-Electro-Mechanical-Systems (MEMS), acceleration sensors and gyroscopes. The acceleration component $\alpha_{qr}$ in the direction of the incident angle $\phi_R$ is now the quantity that has an effect on the phase acceleration profiles $\text{sig}_{aq}(d)$ in the phase angle acceleration $\alpha_q(d)$ in a characteristic manner. For the radial acceleration component:

$$\alpha_{qr} = |\vec{\alpha}_q| \cdot \cos(\Delta\beta_q - \phi_R) \text{ with } \Delta\beta_q = \arg\{\vec{\alpha}_q\}.$$

A phase variation $f_{aqr}((\phi_{RA})$, i.e. the phase angle velocity to be expected on the basis of the measurement of the acceleration $\vec{\alpha}_q$, depending on each assumed incident angle $\phi_{RA}$ in the phase velocity profiles $\text{sig}_{aq}(d)$, is linked with the radial acceleration $\alpha_{qr}$ via a real-value constant $\text{const}_a$, and it applies:

$$f_{aqr}(\phi_{RA}) = \text{const}_a \cdot \alpha_{qr}$$

The constant $\text{const}_a$ depends on the wavelength $\lambda$ and each selected measuring principle, in analogy to the explanations with respect to the velocity and distance.

Based on these phase acceleration profiles $\text{sig}_{aq}(d)$, a further reconstruction prescription can be defined as follows:

$$W_a(d, \varphi_{RA}) = \sum_{q=1}^{Q} \text{sig}_{aq}(d) \cdot e^{-j \cdot f_{aqr}(\varphi_{RA})}.$$

The evaluation of this image function, or acceleration probability distribution $W_a(d, \phi_{RA})$ is made including all evaluation variants in analogy to the evaluation of the image function determined with the aid of the phase velocity profiles.

For reconstruction, each phase acceleration profile $\text{sig}_{aq}(d)$ is thus multiplied with the respective complex phase correction value $\exp(-j\,f_{aqr}(\phi_{RA}))$ for each assumed angle $\phi_{RA}$, and then all $Q-2$ thus phase corrected phase acceleration profiles are summed up.

In an analogous fashion, as has already been explained for the distance holography above, the two-dimensional function as the acceleration probability distribution $W_a(d, \phi_{RA})$ can be separated into two one-dimensional functions $W_a(\phi_{RA})$ or $W_a(d)$.

Particularly advantageously, it can also be applied in this case that the phase angle acceleration $\alpha_q(d)$, just as shown in FIG. 4 for the phase angle velocities $\omega_q(d)$, is almost constant over the entire echo width in a phase acceleration profile $\text{sig}_{aq}(d)$. Consequently, it is also suitable in the present case to apply the reconstruction formula not for all distances d, but in a selective manner only for those distances in which echoes/objects are recognizable in the contributions of the profiles. A consequence for this case is the simplified function for angle estimation as a one-dimensional acceleration probability distribution according to the following:

$$W_a(\varphi_{RA})|_{d=d_0} \sum_{q=1}^{Q} \text{sig}_{aq}(d_0) \cdot e^{-j \cdot f_{aqr}(\varphi_{RA})}.$$

It should be noted at this stage that the one-dimensional acceleration probability distribution $W_a(\phi_{RA})|_{d=d0}$ often has a systematic, in particular a sinusoidal, characteristic. In this case it is possible, after the calculation of a few values of the one-dimensional acceleration probability distribution $W_a(\phi_{RA})|_{d=d0}$, to determine the value of the angle $\phi_{RA}$ in an analytical manner, at which the amount or real portion of the one-dimensional acceleration probability distribution $W_a(\phi_{RA})|_{d=d0}$ is at a maximum, or at which the phase angle, that is the argument of the one-dimensional acceleration probability distribution $W_a(\phi_{RA})|_{d=d0}$, becomes equal to zero, that is at which the assumed angle $\phi_{RA}$ corresponds to the actual angle $\phi_R$. It is thus no longer necessary to vary $\phi_{RA}$ step by step over the entire angle range and to determine the above mentioned extreme values of the one-dimensional acceleration probability distribution $W_a(\phi_{RA})|_{d=d0}$, or the zero crossing of the phase of the one-dimensional acceleration probability distribution $W_a(\phi_{RA})|_{d=d0}$ by a search function. The possibility of the analytic calculation of the above mentioned extreme values of the one-dimensional acceleration probability distribution $W_a(\phi_{RA})|_{d=d0}$, or the zero crossing of the phase of the one-dimensional acceleration probability distribution $W_a(\phi_{RA})|_{d=d0}$, consequently offers the possibility of a substantial reduction of the computation overhead.

The same approach would, of course, be possible in correspondence to the above extension, if the phase angle velocities were used.

In practice, the acceleration and the angle acceleration could be determined, for example, by way of MEMS acceleration sensors and gyroscopes, wherein these quantities could be converted into $|\vec{\alpha}_q|$ and $\Delta\beta_q$, by way of mathematical functions known as such. Preferably, the direction of the acceleration is successively tracked starting with the first aperture point $\vec{\alpha}_1$, from aperture point $\vec{\alpha}_q$ to aperture point $\vec{\alpha}_{q+1}$ by way of a gyroscope.

The particular advantage of the method is that in practice it is much easier to measure accelerations with small drift errors than velocities or distances. This advantage is particularly noticeable in hand-held radio systems. If a transponder carried by a human or a wave-based measuring system carried by a human, which measures a cooperative transponder, such as a landmark, is equipped with acceleration sensors, it is very simple to determine the distance and the angular position of the sensor with respect to the transponder, and thus the position. The idea presented here is therefore particularly suitable, for example, for indoor navigation systems or even for hand-held RFID readers with the ability to determine the position of the RFID tags relative to the reader.

For a vehicle with a large turning circle, or an object moving almost in a straight line, and in particular for a rail or path-guided vehicle or transport mechanism, the use of gyroscopes can be dispensed with, if the phase angle acceleration $\alpha_q(d)$ in the phase acceleration profiles $\text{sig}_{aq}(d)$ that is caused by the rotatory acceleration of the vehicle, is small.

The suggested approach can analogously be applied to further quantities generated by way of differentiation from the velocity and acceleration.

All explanations given in a simplified manner with reference to two-dimensional arrangements for reasons of clarity, can also be transferred to three-dimensional problems by way of geometric considerations.

The method described can be used in many applications: for estimating the angle at which targets are present, such as transponders, RFID tags, that do not allow good distance measurement; in vehicles in order to use a method adapted to the properties of the sensor system present (drift, low precision); and in position determination by way of local radio locating systems and GPS; but also for use in imaging, collision avoidance or navigation with primary radars or ultrasonic sensors.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from

| List of Reference Numerals: | |
|---|---|
| $\vec{a}_q = (x_{aq}, y_{aq})^T$ | aperture points, q = 1, 2, ..., Q |
| $\vec{a}_q$ | vectorial acceleration |
| $a_{qr}$ | acceleration component in the direction of the incident angle $\phi_R$ |
| B | measuring signal bandwidth of the signals, or wave |
| c | propagation velocity of the signals, or wave |
| c* | phase velocity of the signals |
| const. | real-value constant, depending on the measuring principle |
| C | controller |
| d, $d_q$ | instantaneous distance of the object at the q-th aperture point from the sensor |
| $d_R$ | reference distance from object O to the first aperture point |
| $f_{vqr}(\phi_{RA})$ | phase variation for velocity correction |
| $f_{aqr}(\phi_{RA})$ | phase variation for acceleration correction |
| K | maximum number of discrete angle values |
| M | memory |
| O | object/transponder |
| p($\vec{r}$) | object position |
| q | serial index for 1, 2, ..., Q |
| Q | number of measurements/aperture points |
| $\vec{r} = (x, y)^T$ | space coordinate |
| rs | signal coming from object O |
| s | signal from sensor |
| S | sensor |
| $sig_q(d)$ | echo profiles |
| $sig_q(d, \phi_{RA})$ | shifted echo profiles |
| $sig_q(d, \phi_{RA})''$ | adapted echo profiles |
| sumsig(d, $\phi_{RA}$) | sum profile across all aperture points |
| $sig_{vq}(d)$ | phase velocity profiles |
| $sig_{aq}(d)$ | phase acceleration profiles |
| v, $\vec{v}_q$ | velocity |
| V | apparatus |
| W(d, $\phi_{RA}$) | measure for the probability |
| W($\phi_{RA}$) | measure for the probability of the incident angle |
| W(d) | measure for the probability of the object distance |
| $W_v(d, \phi_{RA})$ | velocity probability density function |
| $W_v(\phi_{RA})$ | one-dimensional probability function |
| $W_a(d, \phi_{RA})$ | acceleration probability distribution |
| $W_a(\phi_{RA})$ | one-dimensional acceleration probability distribution |

-continued

List of Reference Numerals:

| | |
|---|---|
| x, y, z | space coordinates |
| $\alpha_q(d)$ | phase angle acceleration |
| $\beta_q$ | reference angle between coordinate systems |
| $\Delta\beta_q$ | angle of movement |
| $\Delta a_q$ | distance between two aperture points |
| $\Delta d_q(\phi_R)$ | lateral distance transverse to the wave propagation direction as distance change of the transmission path from the sensor to the object from aperture point $\vec{a}_1$ to aperture point $\vec{a}_q$ |
| $\Delta d_q(\phi_{RA})$ | assumed lateral distance |
| $\Delta T_q$ | time interval between measurements |
| $\lambda$ | wavelength of signal |
| $\phi_q(d)$ | phase angle of signal |
| $\phi_R$ | incident angle of the planar waves |
| $\phi_{RA}$ | assumed angle, at which the object is apparently seen |
| $\phi_{RAK}$ | discrete angle values of the angle range covered |
| $\omega$ | circle center frequency of the waveform/signals used |
| $\omega_q(d)$ | phase angle velocity |

The invention claimed is:

1. An imaging method with a synthetic aperture for determining at least one of an incident angle and a distance of a sensor from at least one object in space, comprising:
   sensing, at a number of aperture points, one respective echo profile;
   calculating at least one of one phase correction value and one distance correction value for each of a plurality of assumed angles as the at least one incident angle;
   generating adapted profiles based the echo profiles by at least one of adapting the phase by the phase correction value for each of the assumed angles and shifting the distance by the distance correction value;
   forming a probability distribution for the assumed angles from the adapted profiles; and
   determining at least one of a probability value for the incident angle and the distance from the probability distribution.

2. The method according to claim 1, further comprising:
   summing up or integrating, for the assumed angles, the adapted profiles; and
   forming the probability distribution therefrom.

3. The method according to claim 1, further comprising calculating at least one of the phase correction values and the distance correction values on the basis of the aperture points from the position data of the aperture.

4. The method according to claim 1, further comprising generating an adapted echo profile as the adapted profile by at least one of adapting the phase of the echo profiles for each assumed angle by the phase correction value and shifting the distance by the distance correction value.

5. The method according to claim 1, further comprising separating the probability function into one-dimensional probability functions by summing-up or by determining maxima.

6. The method according to claim 1, further comprising:
   forming a number of phase velocity profiles from the echo profiles; and
   determining phase angle velocities as their argument.

7. The method according to claim 6, further comprising calculating the at least one angle assumed as the incident angle in dependence on a relative movement velocity between the wave-based sensor and the object and, in each case, calculating one complex phase correction value as a correction in dependence on a phase variation based on a velocity difference.

8. The method according to claim 6, further comprising summing up or integrating, for each assumed angle, the phase-corrected phase velocity profiles are summed-up or integrated to form velocity probability density functions.

9. The method according to claim 1, further comprising calculating the at least one angle assumed as the incident angle in dependence on a relative acceleration between the wave-based sensor and the object, and, in each case, calculating one complex phase correction value as a correction in dependence on a phase variation based on an acceleration difference.

10. The method according to claim 9, further comprising:
    forming a number of phase acceleration profiles from the echo profiles; and
    determining an acceleration vector as their argument.

11. The method according to claim 9, further comprising summing of or integrating, for each assumed angle, the phase-corrected phase acceleration profiles to form an acceleration probability distribution.

12. The method according to claim 9, further comprising performing an analytical calculation of the extreme values of the one-dimensional acceleration probability distribution or of the zero crossing of the phase of the one-dimensional acceleration probability distribution.

13. The method according to claim 1, further comprising, for sensing the echo profile, transmitting a signal from the sensor to the at least one object, and the at least one object in space includes a transponder, or is configured as a transponder, which receives the signal and transmits a modified signal in dependence on the signal as a signal coming from the object, back to the sensor, which is used as a signal received in the sensor as the echo profile.

14. An apparatus comprising a wave-based sensor for sensing a sequence of echo signals of an object, and comprising at least one of a logic element and a processor that accesses at least one program as a controller, wherein at least one of the logic and the processor is configured for carrying out a method according to claim 1 for determining at least one of an incident angle and a distance of a sensor from at least one object in space.

15. The apparatus according to claim 14, comprising a memory or an interface to a memory, wherein the program is stored in the memory.

16. The apparatus according to claim 14, wherein the object includes a transponder or is configured as a transponder.

* * * * *